United States Patent [19]
Sperlich et al.

[11] Patent Number: 6,077,797
[45] Date of Patent: Jun. 20, 2000

[54] GREEN DECORATION COLORING SUBSTANCE FOR HIGH-TEMPERATURE FIRING, PROCESS FOR ITS PRODUCTION AND USE THEREOF

[75] Inventors: Jörg Sperlich, Offenbach; Katia Jackow, Langenselbold; Stephan Ludwig, Neuberg; Dietrich Speer, Langenselbold; Kai Dorer, Heusenstamm, all of Germany

[73] Assignee: Cerdec Aktiengesellschaft Keramische Farben, Germany

[21] Appl. No.: 09/165,636

[22] Filed: Oct. 2, 1998

[30] Foreign Application Priority Data

Oct. 2, 1997 [DE] Germany ............ 197 43 642

[51] Int. Cl.⁷ ................................................. C03L 8/00
[52] U.S. Cl. .................. 501/17; 501/21; 501/32
[58] Field of Search ............... 501/17, 21, 71, 501/32

[56] References Cited

U.S. PATENT DOCUMENTS

| | | | |
|---|---|---|---|
| 3,928,050 | 12/1975 | Jasinski | 501/71 |
| 4,193,808 | 3/1980 | Khodsky et al. | 501/17 |
| 4,481,261 | 11/1984 | Johnson et al. | 501/17 |
| 4,717,690 | 1/1988 | Hankey et al. | 501/17 |

*Primary Examiner*—Karl Group
*Attorney, Agent, or Firm*—Wenderoth, Lind & Ponack, L.L.P.

[57] ABSTRACT

The invention makes available for the first time pure green decoration coloring substances for high-temperature firing at least at 1000° C., in particular at 1100 to 1250° C., with a color hue angle h in the range of 160°±20°. The decoration coloring substance comprises chromium oxide as the pigment and one or several glass frits as glass flux, and additionally a cobalt compound from the series CoO, $Co(OH)_2$ and Co compounds forming CoO below or at the firing temperature, with the atomic ratio of Co to Cr being in the range of 0.01 to 0.35, preferably 0.15 to 0.25.

20 Claims, No Drawings

GREEN DECORATION COLORING SUBSTANCE FOR HIGH-TEMPERATURE FIRING, PROCESS FOR ITS PRODUCTION AND USE THEREOF

SPECIFICATION

The invention relates to chromium oxide and a glass frit comprising green decoration coloring substance which, during high-temperature firing at least at 1000° C., yields a green decoration with a color hue angle h of 160°±20°.

Ceramic decoration coloring substances represent mixtures of coloring bodies with glass fluxes which are applied on decoration carriers, capable of being fired, for the purposes of decoration and are subsequently burned in at a firing temperature matched to the carrier and the decoration coloring substance. In general, the decoration coloring substance comprises one or several pigments as coloring bodies and one or several glass frits as the glass flux. To produce the decoration coloring substance, its components are, as a rule, finely ground together.

Green decoration coloring substances are conventionally such which comprise as the pigment chromium oxide ($Cr_2O_3$) or a spinel having the formula $Co(Cr_{1-x}Al_x)_2O_4$ with $0<x\leq1$. It was previously not possible to make available coloring substances for high-temperature firing, thus firing above 1000° C., in particular 1100 to 1250° C., which at the cited firing temperatures will yield a pure green, thus a green with a color hue angle at or near the theoretical value of 160°. For example, the color hues of commercially available coloring substances based on chromium oxide are yellow-green and those based on the cited spinel are blue-green or Russian green—by example, reference is made to the colors No. 111456, 111457 and 111458 by Cerdec AG. By combining zirconium-vanadium blue and zirconium-praseodymium yellow, green color hues in the proximity of the desired theoretical value are indeed obtainable, but, even at a pigment concentration of 50 wt. %, such a pigment combination leads only to extremely pale (high L* value and low chroma value C* according to DIN 5033, Part 3), and, thus, hardly marketable, ceramic coloring substances. In the green range with a color hue angle between approximately 135° and approximately 185°, no ceramic coloring substances with high color intensity are available for high-temperature firing.

Consequently, it is the object of the invention to make available an intense green decoration coloring substance which, during firing above 1000° C., such as is applied for example during in-glaze decoration on porcelain, leads to a color hue angle h of approximately 160°. A green with a color hue angle h of approximately 160° is neither bluish nor yellowish. The organic color G 100 which is internationally accepted as reference color (Natural Color System, NCS, F örginstitut Stockholm) has a color hue angle of 160.2°. For the definition of the color hue angle, reference is made to DIN 5033, Part 3.

A green decoration coloring substance was found which has a color hue angle h (DIN 5033, Part 3) of 160°±20° after decoration firing at least at 1000° C., characterized thereby that it comprises chromium oxide and one or several glass frits and, additionally, a cobalt compound from the series cobalt oxide, cobalt hydroxide and cobalt compounds forming cobalt oxide below or at the firing temperature, with the atomic ratio of cobalt to chromium being in the range from 0.01 to 0.35.

The atomic ratio of Co to Cr according to the invention is decisive for the color hue angle. But, in addition to the Co/Cr atomic ratio, the firing temperature and the composition of the glass flux also affect the color hue angle h to a certain extent. A preferred range for the Co/Cr atomic ratio is 0.10 to 0.25. With increasing Co/Cr atomic ratio, the color hue angle increases—see Examples 6 and 7. At a PMK (as defined below) of 5 to 10%, the Co/Cr atomic ratio is preferably in the range of approximately 0.2 to 0.25, at a PMK of 10 to 20% in the range of approximately 0.1 to 0.2. Preferred green decoration coloring substances according to the invention lead to a color hue angle h of 160°±10°, in particular approximately 160°.

At a burn-in temperature below 1000° C., for example at a firing temperature conventionally used for on-glaze decorations, of 820° C., no new crystalline phase is formed, and it is also not possible to obtain pure green color hues attainable above 1000° C. (see Example 1 and Comparison Example 1).

The decoration coloring substance according to the invention can comprise any desired Co compound under the condition that below or at the firing temperature of at least 1000° C. cobalt oxide can be formed and can react with the chromium oxide. Phase analyses have determined that during the firing a spinel phase is formed. It is assumed that through the combination of the yellow-hued $Cr_2O_3$ with the blue Co spinel formed, the pure green hue is attained.

The ability to obtain green decoration coloring substances based on $Cr_2O_3$ with a color hue angle of or near 160° through the presence of a limited quantity of a cobalt compound according to the claim was surprising since a ceramic coloring substance, based on a mixture of chromium oxide and a blue cobalt spinel, during firing above 1000° C. results only in a dirty dark green. Below or at the firing temperature Co spinels form substantially no free cobalt oxide; therefore cobalt spinels are not used in the production of green decoration coloring substances according to the invention.

It was furthermore found that the required shift of the color hue from yellow-green to pure green (h approximately 160°) cannot be effected thereby that the corresponding quantity of the cobalt oxide is used in the form already dissolved in the glass flux. Apparently, during the firing the chromium oxide and the cobalt compound must be in such close contact and be locally present in sufficiently high Co concentration that the spinel formation, considered to be responsible for the color shift, can take place.

Instead of cobalt(II) hydroxide or cobalt(II) oxide, other bivalent cobalt compounds such as $CoCO_3$, Co silicates, Co borates, $Co(NO_3)_2$, Co acetate and Co oxalate, but not cobalt spinels, can also be comprised in the decoration coloring substance according to the invention.

The glass flux is of conventional compositions which may or may not comprise lead. The glass flux is conventionally present in the form of one or several glass frits.

The pigment chromium oxide is commercially available.

The pigment mass concentration (PMK=percent by weight of $Cr_2O_3$ plus the Co compound in the ceramic coloring substance) in the ceramic coloring substances according to the invention is generally in the range from 5 to 60 percent, preferably 5 to 30 percent and especially preferable 10 to 30 percent. The grain [size] distribution is within the conventional scope, namely most frequently $D_{50}=3$ to 5 µm and $D_{90}$ approximately 10 µm.

The production of the green ceramic decoration coloring substances according to the invention takes place in a manner known per se. It is essential that, in addition to chromium oxide and one or several glass frits, a cobalt compound is used in a quantity corresponding to a Co/Cr atomic ratio in the range of 0.1 to 0.4 and that the substances in the mixture are vigorously brought into contact with one another. The cobalt compounds are CoO, Co(OH)$_2$ or a compound forming cobalt oxide at the firing temperature above 1000° C., such as CoCO$_3$, Co silicates, in particular Co silicate, Co(NO$_3$)$_2$, Co acetate and Co oxalate. During the process of vigorously bringing the substances into contact with one another, additional auxiliary substances, such as auxiliary pourability agents as well as auxiliary grinding agents, may be present.

The quantity of the auxiliary agents is in general approximately 0 to 5 wt. %, preferably 0 to 2 wt. %, relative to the decoration coloring substance. Especially preferred decoration coloring substances are substantially free of such auxiliary agents. The substances are in general brought into contact in an intensive mill, such as a ball mill, punching or agitating mill. Grinding to decoration fineness, preferably D$_{90}$ about 10 μm, D$_{50}$ 3 to 5 μm, and D$_{10}$ to 2 μm, can take place in the presence or in the absence of a liquid grinding medium; most frequently, grinding is carried out in the presence of water or a lower alcohol or a mixture thereof. After the drying, the decoration coloring substance, can, if appropriate, be applied in known manner by pasting or printing.

By varying the Co content, the decoration coloring substance according to the invention can be adjusted readily in the range of 160°±20° with respect to the color hue angle. The standard color hue angle of 160°, which, according to the invention, is readily obtainable, also makes possible obtaining pictures in multicolor printing with improved reproduction quality. The decoration coloring substance can be used for direct printing for the production of ceramic decorations which are burned in at least at 1000° C., preferably 1100 to 1250° C. The decorations can be applied by direct or indirect printing on porcelain or other ceramic materials.

EXAMPLES

In general, all decoration coloring substances were prepared according to the following procedure:

1. Grinding:
Bloch-Rosetti mill; small grinding balls, 120 g; approximately 40% water or alcohol as grinding medium; grinding to a grain size distribution of approximately D$_{50}$=3 to 3.5 μm and D$_{90}$=9.5 to 11 μm.

2. Pasting:
Screen-print medium 80820 by Cerdec AG; Pasting ratio (printing color to medium) 10:6. Dispersion was carried out in an Engelsmann machine.

3. Printing:
Printing was carried out with a Fleischle GZ 30 S-screen-print machine and screen 100T; filming was carried out with the film solution 80450 by Cerdec AG. The transfer picture was transferred onto glazed porcelain. Firing took place in a gas tunnel oven for 90 minutes at 1140° C., alternatively at 1220° C.

Example 1

A mixture comprising 15.43 wt. % chromium oxide GN (Bayer AG), 3.43 wt. % cobalt hydroxide and 81.14 wt. % of a lead-free glass frit (No. 901347 by Cerdec AG) was ground in the presence of ethanol. After printing and firing at 1140° C. and 820° C. (not in conformity with the invention) the following color values according to CIE-Lab (DIN 5033, Part 3) were obtained.

| Firing Temperature | h | L* | a* | b* | C* |
| --- | --- | --- | --- | --- | --- |
| 1140° C. | 160.9 | 44.2 | −31.2 | 10.8 | 33.0 |
| 820° C. | 129.6 | 25.4 | −10.9 | 13.2 | 17.2 |

While at a firing temperature of 1140° C., at which a color hue angle h of approximately 160° is obtained, such angle cannot be obtained at the firing at 820° C.

Example 2

A green decoration coloring substance was produced from a glass flux (No. 90368 by Cerdec AG), Cr$_2$O$_3$ and CoSiO$_3$. The Co/Cr atomic ratio was 0.03, the pigment mass concentration [100 (Cr$_2$O$_3$+CoSiO$_3$)/(flux+Cr$_2$O$_3$+CoSiO$_3$)] 14%. The color values after firing at 1220° C. were: L*=51.4, a*=−17.4, b*=13.9, C*=22.3 and h=141.2. The example shows that a very low Co content leads already to an increase of the h value.

Examples 3 to 5

The compositions and CIE-Lab values, including the h value, can be found in the table:

| Example No. | | 3 | 4 | 5 |
| --- | --- | --- | --- | --- |
| Cr$_2$O$_3$ (wt. %) | | 10.92 | 7.20 | 10.09 |
| Co(OH)$_2$ (wt. %) | | 2.75 | 2.46 | 2.48 |
| Glass frit (wt. %) | | | | |
| No. 901347 | | 86.33 | — | — |
| No. 90016 | | — | 90.36 | 87.43 |
| Firing at 1140° C. | C* | 30.6 | 31.8 | |
| | h | 168.8 | 170.7 | |
| | L* | 48.0 | 48.4 | |
| | a* | −30.0 | −31.2 | |
| | b* | 5.9 | 5.1 | |
| Firing at 1220° C. | C* | 29.1 | 29.2 | 32.2 |
| | h | 172.2 | 172.7 | 154.8 |
| | L* | 48.5 | 48.4 | 44.8 |
| | a* | −28.8 | −29.0 | −29.1 |
| | b* | 4.0 | 3.7 | 13.7 |

Examples 6 and 7

The effect of the Co/Cr atomic ratio at a pigment mass concentration (PMK) of 10%, respectively 19%, in the decoration coloring substance was investigated. As the flux served a lead-free glass frit (No. 90016 by Cerdec AG). Cr was used as Cr$_2$O$_3$ and Co as Co(OH)$_2$. Color values are listed in the table.

| Co/Cr ratio | PMK (%) | C* | h* [sic] | L* | a* | b* |
| --- | --- | --- | --- | --- | --- | --- |
| 0 | 10 | 35.5 | 135.6 | 39.8 | −25.4 | 24.9 |
| 0.10 | 10 | 35.2 | 139.2 | 48.5 | −26.6 | 23.0 |
| 0.15 | 10 | 33.0 | 149.5 | 47.8 | −28.4 | 16.7 |
| 0.17 | 10 | 32.5 | 153.6 | 47.0 | −29.1 | 14.4 |
| 0.19 | 10 | 31.0 | 158.7 | 47.7 | −28.8 | 11.2 |
| 0.21 | 10 | 30.3 | 162.5 | 47.1 | −28.9 | 9.1 |
| 0.30 | 10 | 28.8 | 176.6 | 46.4 | −28.7 | 1.7 |
| 0.1 | 19 | 31.8 | 150.1 | 38.4 | −27.5 | 15.9 |
| 0.15 | 19 | 32.1 | 157.7 | 37.5 | −29.7 | 12.2 |
| 0.17 | 19 | 31.1 | 162.1 | 36.6 | −29.6 | 9.5 |
| 0.19 | 19 | 29.8 | 166.2 | 36.0 | −28.9 | 7.1 |

-continued

| Co/Cr ratio | PMK (%) | C* | h* [sic] | L* | a* | b* |
|---|---|---|---|---|---|---|
| 0.21 | 19 | 30.4 | 168.9 | 35.8 | −29.8 | 5.9 |
| 0.30 | 19 | 29.7 | 179.9 | 35.2 | −29.7 | 0.0 |

Results of the measurements show that with increasing Co/Cr atomic ratio, the h value increases. Furthermore follows from the table that at identical Co/Cr ratios the h value increases with increasing PMK.

Example 7

Analogous to Example 6, decoration coloring substances were produced using another lead-free glass frit (No. 90134 by Cerdec AG) and were measured after firing at 1220° C. The color values can be found in the table:

| Co/Cr ratio | PMK (%) | C* | h* [sic] | L* | a* | b* |
|---|---|---|---|---|---|---|
| 0.1 | 10 | 36.2 | 140.0 | 46.7 | −27.7 | 23.3 |
| 0.15 | 10 | 33.7 | 148.7 | 47.0 | −28.8 | 17.5 |
| 0.21 | 10 | 31.8 | 159.1 | 46.8 | −29.7 | 11.4 |
| 0.3 | 10 | 28.9 | 176.4 | 46.9 | −28.9 | 1.8 |
| 0.1 | 19 | 34.7 | 147.1 | 38.6 | −29.1 | 18.9 |
| 0.15 | 19 | 33.0 | 156.3 | 37.6 | −30.2 | 13.3 |
| 0.17 | 19 | 33.0 | 159.1 | 37.7 | −30.8 | 11.8 |
| 0.3 | 19 | 30.6 | 179.9 | 35.9 | −30.6 | 0.1 |

With respect to the effect of the Co/Cr atomic ratio and the PMK, the experiments show a pattern analogous to Example 6. The effect of the type of glass frit—Compare Example 6 with Example 7—in contrast, is lower.

Comparison Examples

Commercially available green decoration coloring substances based on a lead-free glass frit and of a pigment from the series chromium oxide (A), of a pigment (B) substantially comprising a cobalt chromium spinel with low Al content, respectively of a mixture comprising a Co(Cr, Al)$_2$O$_4$ spinel and an aluminum-containing corundum (C), after application on glazed porcelain and firing at 1220° C. yielded the following color values:

| Pigment | A1 | B2 | C3 |
|---|---|---|---|
| Pigment wt. % | 18 | 20 | 28 |
| Frit wt. % | 82 | 80 | 72 |
| L* | 41.2 | 38.1 | 32.1 |
| a* | −25.7 | −27.5 | −32.3 |
| b* | 27.2 | −11.2 | −3.0 |
| C* | 37.4 | 29.7 | 32.4 |
| h | 133.4 | 202.2 | 185.4 |

A color hue angle h in the range of approximately 133° to 185° is not covered by prior known decoration coloring substances for high-temperature firing.

What is claimed is:

1. Green decoration coloring substance with a color hue angle h (DIN 5033, Part 3) of 160°±20° after a decoration firing at least at 1000° C., which comprises chromium oxide and one or several glass frits and additionally a cobalt compound selected from the group consisting of cobalt oxide, cobalt hydroxide and cobalt compounds forming cobalt oxide below or at the firing temperature, with the atomic ratio of cobalt to chromium being in the range of 0.01 to 0.35.

2. Green decoration coloring substance as claimed in claim 1, wherein the atomic ratio of Co to Cr is in the range of 0.1 to 0.25.

3. Green decoration coloring substance as claimed in claim 1, wherein the atomic ratio of Co to Cr at a pigment mass concentration of 10 to 20% is in the range of 0.10 to 0.2 and at a pigment mass concentration of 5 to 10% is in the range of 0.2 to 0.25, the pigment mass concentration being the percent by weight of the chromium oxide plus the cobalt compound in the composition.

4. Green decoration coloring substance as claimed in claim 1 which comprises cobalt hydroxide as the cobalt compound.

5. Process for the production of a green decoration coloring substance with a color hue angle h of 160°±20° after a decoration firing at least at 1000° C., wherein chromium oxide, one or several glass frits and a cobalt compound selected from the group consisting of cobalt oxide, cobalt hydroxide and cobalt compounds, forming cobalt oxide below or at the firing temperature, with the atomic ratio of cobalt to chromium being in the range of 0.01 to 0.35, are vigorously brought into contact with one another in the presence or absence of auxiliary agents.

6. Process as claimed in claim 5, wherein chromium oxide, the cobalt compound and the glass frit(s) are ground together in an intensive mill in the presence of water or a lower alcohol and are subsequently dried.

7. Process as claimed in claim 5, wherein chromium oxide and the cobalt compound are added to the one or several glass frits in a quantity corresponding to a Co/Cr atomic ratio of 0.10 to 0.25.

8. Green decorative coloring substance as claimed in claim 2 which comprises cobalt hydroxide as the cobalt compound.

9. Green decorative coloring substance as claimed in claim 3 which comprises cobalt hydroxide as the cobalt compound.

10. Process as claimed in claim 6, wherein chromium oxide and the cobalt compound are added to the one or several glass frits in a quantity corresponding to a Co/Cr atomic ratio of 0.10 to 0.25.

11. A method for the production of a ceramic decoration which comprises applying a composition containing the coloring substance of claim 1 to a ceramic substrate and firing the ceramic substrate having the composition applied thereon at a temperature of at least 1000° C.

12. A method for the production of a ceramic decoration which comprises applying a composition containing the coloring substance of claim 2 to a ceramic substrate and firing the ceramic substrate having the composition applied thereon at a temperature of at least 1000° C.

13. A method for the production of a ceramic decoration which comprises applying a composition containing the coloring substance of claim 3 to a ceramic substrate and firing the ceramic substrate having the composition applied thereon at a temperature of at least 1000° C.

14. A method for the production of a ceramic decoration which comprises applying a composition containing the coloring substance of claim 4 to a ceramic substrate and firing the ceramic substrate having the composition applied thereon at a temperature of at least 1000° C.

15. The process according to claim 7 wherein the cobalt compound is CoO, Co(OH)$_2$, CoCO$_3$ or a Co silicate.

16. The process according to claim 10 wherein the cobalt compound is CoO, Co(OH)$_2$, CoCO$_3$ or a Co silicate.

17. Green decoration coloring substance with a color hue angle h (DIN 5033, Part 3) of 160°±20° after a decoration firing at least at 1000° C., which comprises chromium oxide and one or several glass frits and additionally a cobalt compound selected from the group consisting of cobalt oxide, cobalt hydroxide and cobalt compounds forming cobalt oxide below or at the firing temperature, with the atomic ratio of cobalt to chromium being in the range of 0.01 to 0.35, and wherein the pigment mass concentration is in the range of 5 to 60%, the pigment mass concentration being the percent by weight of the chromium oxide plus the cobalt compound in the composition.

18. Green decoration coloring substance as claimed in claim 17, wherein the atomic ratio of Co to Cr is in the range of 0.1 to 0.25.

19. Green decoration coloring substance as claimed in claim 17, wherein the atomic ratio of Co to Cr at a pigment mass concentration of 10 to 20% is in the range of 0.10 to 0.2 and at a pigment mass concentration of 5 to 10% is in the range of 0.2 to 0.25.

20. Green decoration coloring substance as claimed in claim 17, which comprises cobalt hydroxide as the cobalt compound.

* * * * *